US012572906B2

(12) United States Patent
Teitel et al.

(10) Patent No.: US 12,572,906 B2
(45) Date of Patent: Mar. 10, 2026

---

(54) INSTANT PAYMENTS AT POINT OF SALE VIA REAL TIME PAYMENT RAIL

(71) Applicant: Wells Fargo Bank N.A., San Francisco, CA (US)

(72) Inventors: Brent Teitel, San Francisco, CA (US); Michelle E. Ziolkowski, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 63 days.

(21) Appl. No.: 18/385,198

(22) Filed: Oct. 30, 2023

(65) Prior Publication Data

US 2024/0144209 A1 May 2, 2024

Related U.S. Application Data

(60) Provisional application No. 63/421,004, filed on Oct. 31, 2022.

(51) Int. Cl.
| | |
|---|---|
| *G06Q 20/10* | (2012.01) |
| *G06Q 20/20* | (2012.01) |
| *G06Q 20/32* | (2012.01) |

(52) U.S. Cl.
CPC ............. *G06Q 20/10* (2013.01); *G06Q 20/20* (2013.01); *G06Q 20/3274* (2013.01); *G06Q 20/3276* (2013.01)

(58) Field of Classification Search
CPC .... G06Q 20/10; G06Q 20/20; G06Q 20/3274; G06Q 20/3276; G06Q 20/12;

(Continued)

---

(56) References Cited

U.S. PATENT DOCUMENTS

| | | | | |
|---|---|---|---|---|
| 10,885,541 B1 * | 1/2021 | Ho | ...................... | G06Q 20/387 |
| 10,970,695 B2 * | 4/2021 | Finch | ................. | G06Q 20/4014 |

(Continued)

OTHER PUBLICATIONS

Nseir, Sana, Nael Hirzallah, and Musbah Aqel. "A secure mobile payment system using QR code." 2013 5th International Conference on Computer Science and Information Technology. IEEE, 2013. (Year: 2013).*

(Continued)

*Primary Examiner* — Nathan A Mitchell
(74) *Attorney, Agent, or Firm* — Foley & Lardner LLP

(57) ABSTRACT

A method includes determining a payment amount based in response to receiving a transaction request; providing transaction data to a user device in response to initiating a transaction with a user device, the transaction data including the payment amount; receiving user data from the user device, the user data including a request to provide funds via a payment rail and account information identifying a first institution associated with the user device; and receiving a funds received confirmation from a second institution computing system. The funds received confirmation is provided to the terminal device in response to a fund transfer corresponding with the payment amount being received by the second institution computing system from a payment rail. The payment rail receives the fund transfer from the first institution computing system in response to the transaction data being provided to the first institution computing system from the user device.

20 Claims, 5 Drawing Sheets

(58) Field of Classification Search
CPC .............. G06Q 20/322; G06Q 20/326; G06Q
20/3278; G06Q 20/401; G06Q 20/4012;
G06Q 20/4014; G06Q 20/40145; G06Q
20/405; G06Q 20/4097
See application file for complete search history.

(56) References Cited

U.S. PATENT DOCUMENTS

| | | | | |
|---|---|---|---|---|
| 11,055,692 | B1 * | 7/2021 | Bodalia ............ | G06K 19/06112 |
| 11,151,533 | B2 * | 10/2021 | Jones ................... | G06Q 20/204 |
| 11,379,807 | B2 * | 7/2022 | Sinton ................... | G06Q 20/12 |
| 2013/0006872 | A1 * | 1/2013 | Chandoor .......... | G06Q 20/3223 |
| | | | | 705/26.1 |
| 2013/0054463 | A1 * | 2/2013 | Olson ............... | G06Q 20/0855 |
| | | | | 705/44 |
| 2014/0143155 | A1 * | 5/2014 | Karlov ............... | G06Q 20/4012 |
| | | | | 705/71 |
| 2014/0279111 | A1 * | 9/2014 | Mahaffey ........... | G06Q 20/3278 |
| | | | | 705/21 |
| 2015/0193765 | A1 * | 7/2015 | Gadotti ............. | G06Q 20/3278 |
| | | | | 705/39 |
| 2015/0248663 | A1 * | 9/2015 | Meere ................... | G06Q 20/10 |
| | | | | 705/17 |
| 2017/0024738 | A1 * | 1/2017 | Vaidyanathan ........ | G06Q 20/10 |
| 2018/0189769 | A1 * | 7/2018 | Narasimhan ........... | G06Q 20/20 |
| 2020/0167753 | A1 * | 5/2020 | Arora ................... | G06Q 20/206 |
| 2021/0133748 | A1 * | 5/2021 | Li ........................ | G06Q 20/085 |
| 2021/0398104 | A1 * | 12/2021 | Yan ................... | G06Q 20/4037 |
| 2022/0122057 | A1 * | 4/2022 | Monemvasitis ..... | G06Q 20/352 |
| 2023/0259394 | A1 * | 8/2023 | Mattison .............. | G06Q 20/223 |
| | | | | 718/104 |
| 2024/0127242 | A1 * | 4/2024 | Hernandez ........... | G06Q 20/385 |
| 2024/0403882 | A1 * | 12/2024 | Eaton ................... | G07F 7/1025 |

OTHER PUBLICATIONS

Njebiu, Victor, Michael Kimwele, and Richard Rimiru. "Secure contactless mobile payment system." 2021 IEEE Latin-American Conference on Communications (Latincom). IEEE, 2021. (Year: 2021).*

The Clearing House. "The Clearing House Customer Documentation, RTP Message Specification", Version 2.9, Jan. 2021, 428 pages.

* cited by examiner

102

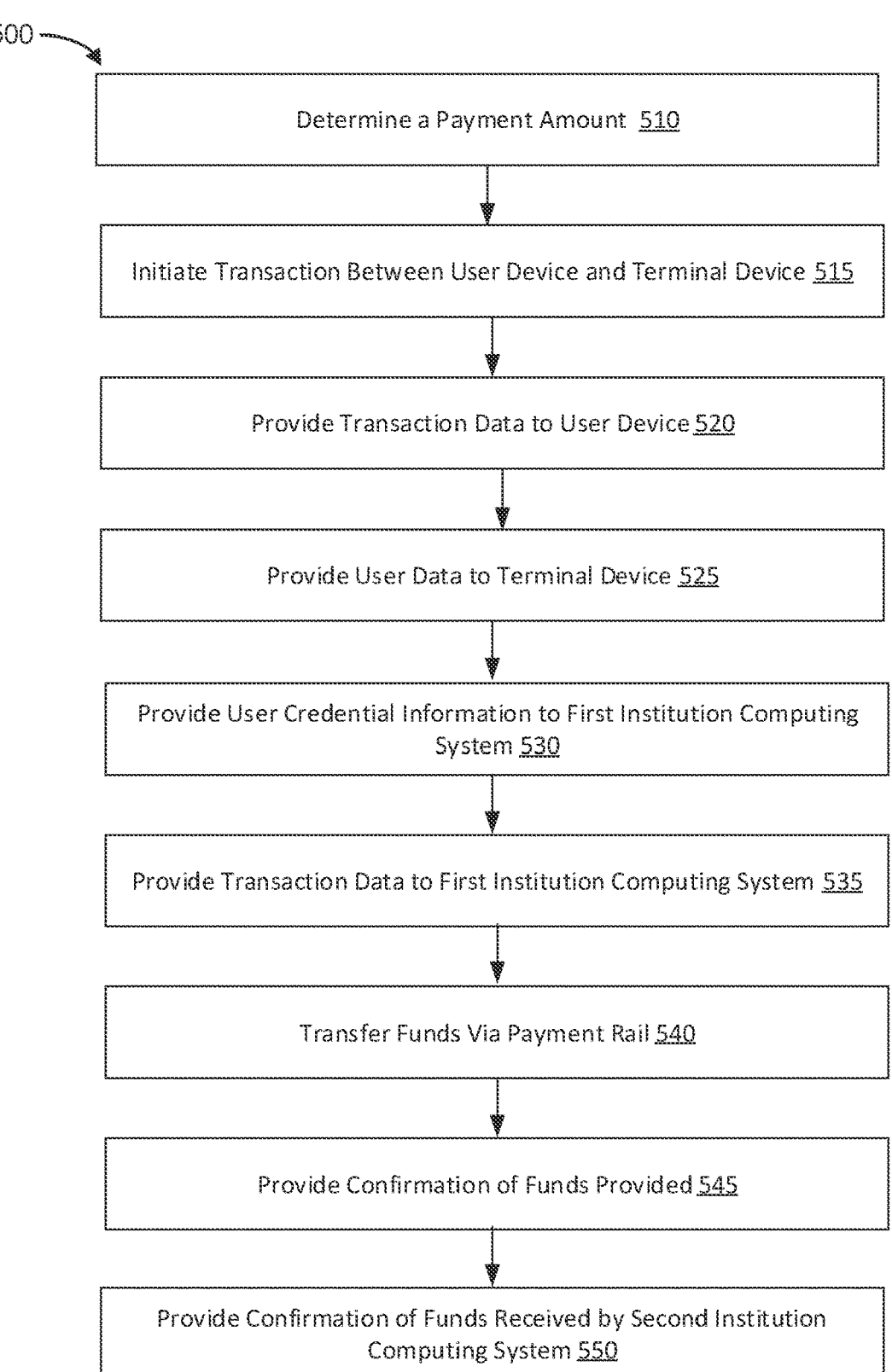

500

Determine a Payment Amount  510

Initiate Transaction Between User Device and Terminal Device 515

Provide Transaction Data to User Device 520

Provide User Data to Terminal Device 525

Provide User Credential Information to First Institution Computing System 530

Provide Transaction Data to First Institution Computing System 535

Transfer Funds Via Payment Rail 540

Provide Confirmation of Funds Provided 545

Provide Confirmation of Funds Received by Second Institution Computing System 550

FIG. 3

INSTANT PAYMENTS AT POINT OF SALE VIA REAL TIME PAYMENT RAIL

CROSS REFERENCE TO RELATED APPLICATION

This application claims the benefit of and priority to U.S. Provisional Patent Application No. 63/421,004 titled "Instant Payments At Point Of Sale Via Real Time Payment Rail," filed Oct. 31, 2022, which is incorporated herein by reference in its entirety and for all purposes.

TECHNICAL FIELD

The present disclosure relates generally to the field of systems and methods for electronic transactions. More specifically, the present disclosure relates to systems and methods for enabling parties to use their electronic devices to enable real time or nearly real time electronic transactions.

BACKGROUND

Payments for products and services are often completed using credit cards, debit cards, checks, or cash. At the same time, most people carry some type of mobile handheld electronic device, such as a smart phone, personal digital assistant, portable gaming devices, and so on. Most of these devices tend to have a wireless Internet connection. A person may wish to make payments to merchants or other individuals using these mobile devices. Likewise, a person may wish to transfer funds to other individuals using their mobile devices. Even with this wireless connectivity, transactions often take time to process that may be undesirable in various circumstances. In this way, various transaction security protocols are implemented that provide security to the transaction but utilize processing power to delay the actual transaction from occurring. Enhanced systems and methods of facilitating real time or nearly real time transactions would be desirable.

SUMMARY

According to one example embodiment, a computer-implemented method is provided. The computer-implemented method includes: determining, by a terminal device, a payment amount in response to receiving a transaction request, providing, by the terminal device, transaction data to a user device in response to initiating a transaction with the user device, the transaction data including the payment amount; receiving, by the terminal device, user data from the user device, the user data including a request to provide funds via a payment rail and account information identifying a first institution associated with the user device; and receiving, by the terminal device, a funds received confirmation from a second institution computing system, where the funds received confirmation is provided to the terminal device in response to a funds transfer corresponding with the payment amount being received by the second institution computing system from a payment rail. In some embodiments, the payment rail receives the funds transfer from the first institution computing system in response to the transaction data being provided to the first institution computing system from the user device.

According to an example embodiment, the transaction data provided to the user device from the terminal device further includes an account identifier and the payment rail may provide the fund transfer to the second institution computing system based on the account identifier. The transaction data that may be provided to the user device from the terminal device may include a merchant identifier configured to identify an operator of the terminal device such that user device can determine the identity of the operator of the terminal device. At least a portion of the transaction data may be provided to the user device from the terminal device via a merchant token. According to an example embodiment, initiating a transaction with a user device includes a NFC data exchange between the terminal device and the user device. According to an example embodiment, initiating a transaction with a user device includes capturing a code using a scanning device of the user device. The code may include a QR code displayed on a display screen of the terminal device. The user device may be a first mobile device and the terminal device may be a second mobile device. In some embodiments, the terminal device is a point-of-sale device.

According to another example embodiment, a user device includes at least one processor and at least one memory coupled to the at least one processor, the at least one memory having instructions stored thereon that when executed by the at least one processor, cause the at least one processor to: provide an initiation of payment via payment rail to a terminal device; receive transaction data from the terminal device, the transaction data including a payment amount and destination information; provide user credential information to a first institution computing system, the user credential information including at least one of biometric information, a PIN, or a passcode; provide at least a portion of the transaction data to the first institution computing system, the portion of the transaction data including the payment amount and the destination information such that the first institution computing system provisions funds corresponding to the payment amount to a payment rail with instructions to provision the funds from the payment rail to the account identified in the destination information in response to receiving the credential information and the portion of the transaction data; and receive a funds provided confirmation from the first institution computing system in response to the first institution computing system provisioning funds to the payment rail.

According to various embodiments, the initiation of the payment via payment rail is provided to the terminal device in response to a user selection of an intention to pay via the payment rail within a user application of the user device. The initiation of the payment via payment rail may be provided to the terminal device via a NFC data exchange. The initiation of the payment via payment rail may be provided to the terminal device in response to the user device scanning a code displayed on the terminal device. The user credential information may be provided to the first institution computing system via a token. The token may be stored on the user device.

According to another example embodiment, a terminal device includes at least one processor, and at least one memory coupled to the at least one processor. The at least one memory has instructions stored thereon that, when executed by the at least one processor, cause the at least one processor to: provide transaction data to a user device in response to initiating a transaction with a user device, the transaction data including the payment amount and destination information; receive user data from the user device, the user data including a request to provide funds via a payment rail and account information identifying a first institution associated with the user device; and receive a funds received confirmation from a second institution computing system.

The funds received confirmation may be provided to the terminal device in response to a fund transfer corresponding with the payment amount being received by the second institution computing system from a payment rail. The payment rail may receive the fund transfer from the first institution computing system in response to the transaction data being provided to the first institution computing system from the user device.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 3 illustrates a method of transferring resources, according to an example embodiment.

DETAILED DESCRIPTION

Figure 1:
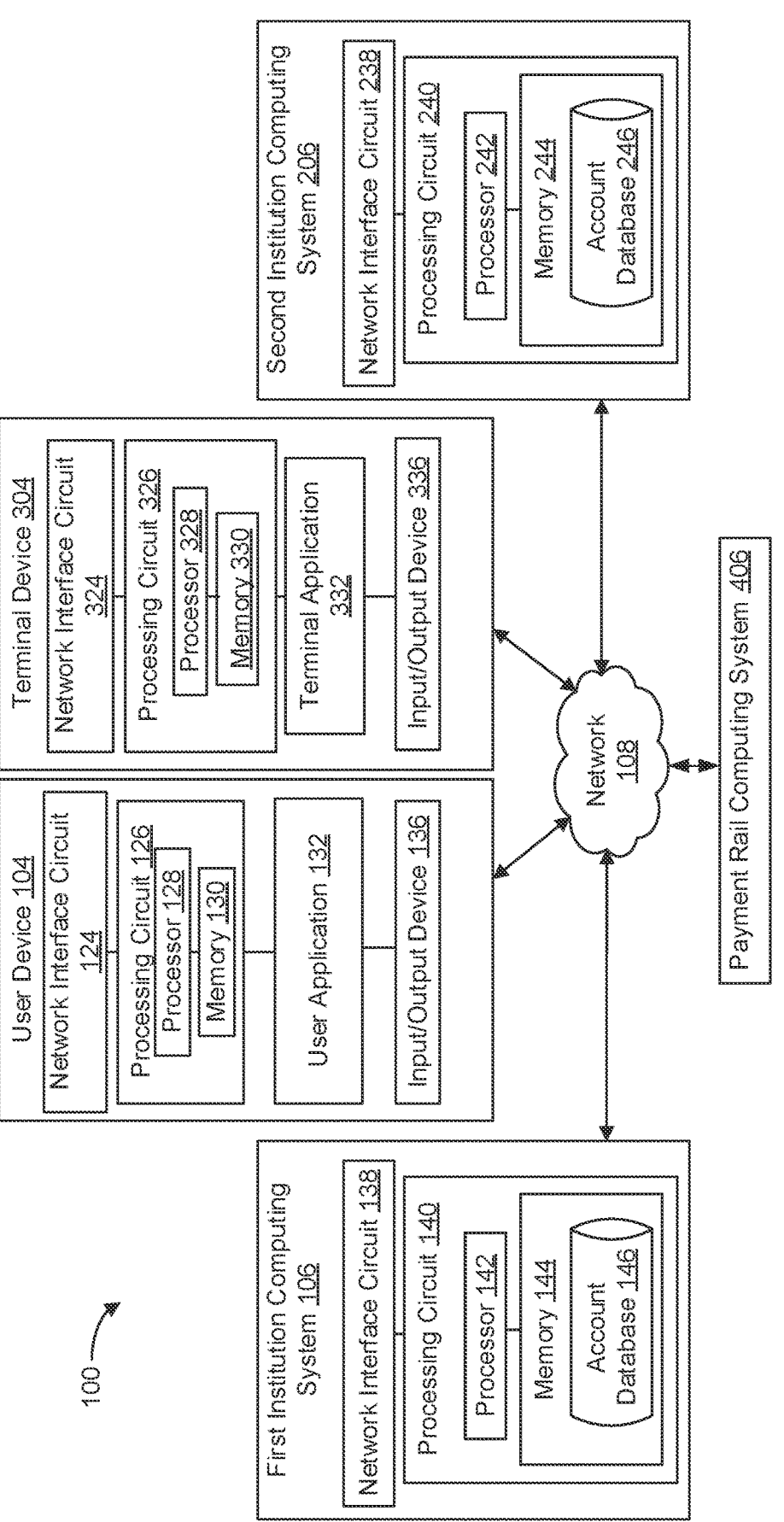
FIG. 1 is a block diagram of a transaction processing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, payment systems and methods for real time (e.g., instantaneous) or near real time (e.g., low latency) transactions are disclosed according to various embodiments herein. More particularly, the present disclosure relates to the use of two-way communications between a first device (e.g., a user device) and a second device (e.g., a terminal device) to initiate and process transactions in real time or nearly real time. According to various embodiments, the transaction or payment system leverages a payment rail (e.g., The Clearing House Real Time Payment (RTP®), the FedNow, etc.) to facilitate the transfer of resources (e.g., funds such as United States dollars (USD), etc.) from a first account (e.g., a first demand deposit account (DDA) associated with a first institution) to a second account (e.g., a second demand deposit account (DDA) associated with a second institution) in real time or near real time. By doing so, the payment system enables the receiver of the funds to instantaneously access the funds without waiting for settlement. Further, the payment or transaction system allows for instantaneous or nearly instantaneous transfer of funds, which may be final and irrevocable, thereby reducing the likelihood of fraud or chargeback requests. Additionally, the payment or transaction system enables payment without requiring a credit card, thereby reducing fees associate with a credit card.

According to various embodiments, the payment or transaction system includes a user device operated by a purchaser, a terminal device operated by a merchant, a first institution computing system holding an institution account associated with the purchaser, a second institution computing system associated with an institution account held by the merchant, and a payment rail computing system. The terminal device determines a payment amount based in response to receiving a transaction request. For example, the terminal device may be communicably coupled to a cash register machine configured to output a payment amount in exchange for the purchase of one or more items. In another example embodiment, the payment amount may be determined based on a user input into the terminal device. For example, the terminal device may be coupled to a scanner that scans a universal product code (e.g., barcode and series of digits) or another code. Based on the code scanning, the payment amount and other information associated with the code is determined (e.g., product identifier, etc.). The terminal device then provides the transaction data to a user device. The transaction data defines one or more attributes of the transaction, such as the payment amount, a merchant identifier (ID) that is unique to the merchant requesting payment, a list of the items being purchased (e.g., based on the scanning of multiple universal product codes for multiple items), a merchant account ID that uniquely identifies the merchant, destination information that uniquely identifies the institution account associated with the merchant, a payment rail ID that uniquely identifies the payment rail to be used to complete the purchase, a transaction number that uniquely identifies the transaction, and/or promotions being offered by the merchant.

According to various embodiments, the terminal device receives user data from the user device. Alternatively, this information may be received, retrieved, and/or determined subsequent to the user device receiving the transaction data. The user data defines one or more attributes, characteristics, and/or information regarding the user device and/or the purchaser. For example, the user data may include a device ID that is unique to the user device, a purchaser ID that uniquely identifies the purchaser, a customer reward number associated with the purchaser, an indication that the purchaser intends to pay via the payment rail, and/or an account number that identifies the institution account operated by the purchase.

According to various embodiments, the user device initiates a transaction in response to receiving the transaction data. For example, the user device may communicate the payment amount, the merchant ID, the merchant account ID, the payment rail ID, and the transaction number (among potentially other information) to the first institution computing system. In response, the first institution computing system may provision funds from a demand deposit account (DDA) associated with the purchaser to the account associated with the merchant (e.g., as identified by the merchant account ID) via the payment rail identified by the payment rail ID. According to various embodiments, the terminal device receives a funds received confirmation from the second institution computing system in response to the funds being transferred to the account associated with the merchant. For example, the second institution computing system may provide the funds received confirmation to the terminal device in response to the funds being received by the merchant account with the second institution from the payment rail.

An example of operation may be described as follows. Transaction data may be provided to the user device from the terminal device. The transaction data may include an account identifier and the payment rail for the funds transfer to the second institution computing system. The transaction data provided to the user device from the terminal device may also include a merchant identifier configured to identify an operator of the terminal device such that user device can determine the identity of the operator of the terminal device. At least a portion of the transaction data may be provided to the user device via a short-range wireless communication (e.g., Bluetooth, NFC, etc.). In this regard and according to an example embodiment, initiating a transaction with the user device includes an NFC data exchange between the terminal device and the user device. In which case, certain transaction data may be provided from the terminal device via a token or another data payload. According to another example embodiment, initiating a transaction with the user device includes capturing a code using a scanning device of the user device. The code may include a QR code (or another optically scanned code, such as a barcode, etc.) displayed on a display screen of the terminal device.

Technically and beneficially, the systems, methods, computer-readable media, and apparatuses described herein may operate counter to typical mobile wallet transactions to, in turn, provide additional security to the electronic transaction and enable the transaction to occur in relatively shorter amount of time. In typical mobile wallet transactions, a tokenization process is implemented with the payment account. For example, tokenized account information may be provided to a point-of-sale device and the point-of-sale device initiates a charge to the account associated with the token. However, here, a user application on a user device that is capable of connecting to multiple institutions may store tokenized account information (e.g., a DDA account) and initiate a credit push transfer (e.g., via a payment rail) when prompted by a terminal device via contactless technology (e.g., NFC, QR code, etc.). Since the user device initiates the transaction, the transaction process may be accelerated by reducing or minimizing settlement time, reducing security concerns, and reducing the likelihood of chargeback requests. Further, since the real time or near real time transfer of resources described herein are not debit pull transfers, according to various embodiments, the user of the user device must initiate payment via their own institution (as described herein) when prompted by the terminal device.

As described herein and by the terminal device providing transaction data to the user device that then initiates the transaction with the merchant, the tokenization process may be avoided thereby hastening the transaction. Transaction security is provided via several mechanisms and/or processes, such as (i) the use of a short range wireless communication (e.g., NFC, Bluetooth®, etc.) whereby the user device and terminal must be relatively close to each other to prevent fraudsters from intercepting messages, (ii) use of a credential subsequent to the short range communication to enable the transaction (e.g., a biometric, a passcode or security code, a combination thereof, etc.), and (iii) the routing of the transaction and/or user information through the user device to the institution computing systems and payment rail that enables a relatively quicker transaction to occur with minimal additional transmissions (e.g., to a token provider). Moreover, the resources (i.e., funds) may immediately or nearly immediately hit a recipient's (e.g., merchant) account. For the merchant, transaction fees may be significantly lower, catering to merchants that do not accept cards, pass fees on to consumers or plan on removing card acceptance completely. Payment may also be final and irrevocable which can combat friendly fraud and unreasonable chargeback requests. For the provider or financial institution, the systems, methods, computer-readable media, and apparatuses described herein represent an incremental transaction opportunity for merchants that do not accept cards and will combat attrition for those that plan or have removed them. The systems, methods, computer-readable media, and apparatuses enable banks or other financial institutions to hedge against closed loops and competing schemes that have shown strong consumer and merchant interest.

As described herein and beneficially, the systems and methods may be applicable with business-to-business, customer-to-merchant, person-to-person, and other types of transactions. In this way, the user device may be a first mobile device and the terminal device may be a second mobile device. The terminal device may be a point-of-sale device for customer-to-merchant transactions. These and other features and benefits are described more fully herein below.

Referring now to FIG. 1, a block diagram of a payment or transaction processing system 100 is shown, according to an example embodiment. The transaction processing system 100 is configured to enable initiation and completion of a transfer of funds from a first party (e.g., a purchaser, a user of a user device, etc.) to a second party (e.g., a merchant, a seller, an operator of a terminal device, etc.) in real time or near real time. The payment processing system 100 may leverage two-way communication between a user device 104 and a terminal device 304 to communicate transaction data to the user device 104 and user data to the terminal device 304 to initiate payment (e.g., a transfer of funds) from a first account associated with the user device 104 to a second account associated with the terminal device 304. According to various embodiments, the first account is accessible (e.g., held by, etc.) via the first institution computing system 106 and the second account is accessible (e.g., held by, etc.) via the second institution computing system 206.

The payment processing system 100 includes, among other systems, a user device 104, a terminal device 304, a first institution computing system 106, a second institution computing system 206, and a payment rail computing system 406. The various systems and devices may communicate through a network 108, which may include one or more of the Internet, cellular network, Wi-Fi, Wi-Max, a proprietary banking network, any other type of wired or wireless network such as a QR code, NFC, Bluetooth, low energy Bluetooth, RFID, hypersonic, cellular 3G, 4G, GSM, LiFi, etc. In some embodiments, the first institution computing system 106 and second institution computing system 206 may be owned by, managed by, or otherwise associated with the same provider institution or entity. In other embodiments, the first institution computing system 106 and second institution computing system 206 may be owned by, managed by, or otherwise associated with different provider institutions or entities.

The user device 104 may be used by, owned by, managed by, or otherwise associated with a user (e.g., a business owner or employee, a consumer, etc.) to interact with a user application 132 to implement at least some of the functions described herein. The user device 104 may, for example, be a cellular phone, smart phone, personal digital assistant, portable gaming device, or other suitable device. In other embodiments, another type of user device may be utilized, such as a desktop or laptop computer executing browser software to perform the operations described herein as being performed by the user device 104.

The user device 104 includes a network interface circuit 124, a processing circuit 126 having a processor 128 and a memory 130, the user application 132, and an input/output device 136. The network interface circuit 124 may include, for example, program logic and associated hardware (e.g., transceivers, network cards, etc.) that connects the user device 104 to the network 108. Via the network 108, the user device 104 may receive and display screens from the first institution computing system 106 that depict, for example, account information, transaction information, and so on. In one embodiment, a screen may be used to request a username and password information from the user, to prompt the user to provide information regarding the amount of a payment, to identify a merchant for a transaction, to identify an individual for a transaction (e.g., name, address, phone number or e-mail, a selection of a recipient stored in the memory 130 of the user device 104, etc.), and so on. Additionally, or alternatively, the screen may be used to request credential information (e.g., a biometric scan, a PIN, a passcode, a combination thereof, etc.) from the user to initiate a payment. Such screens are presented to the user via the input/output device 136. The input/output device 136 may be used to permit the user to initiate account access and to facilitate receiving requested information from the user. The input/output device 136 may include, for example, a keypad or keyboard, a touchscreen, a microphone, etc.

The user application 132 may include program logic executable by the user device 104 to implement at least some of the functions described herein. For example, the user application 132 may be capable of connecting to multiple institutions and may store tokenized account information (e.g., a DDA account) associated with each of the institutions and initiate a credit push transfer (e.g., via a payment rail) when prompted by a terminal device via contactless technology (e.g., NFC, QR code, etc.).

The first institution computing system 106 may provide a software application and make the software application available for download via an app store. For example, the first institution computing system 106 may make the user application available to be downloaded (e.g., via the online banking website of the first institution, via an app store, or in another manner). Responsive to a user selection of an appropriate link, the user application 132 may be transmitted to the user device 104 and may cause itself to be installed on the user device 104. Installation of the user application creates the user application 132 on the user device 104. Specifically, after installation, the thus-modified user device 104 includes the user application 132 (embodied as instructions or executable code in an application package stored in non-transitory memory that are executed by the processor). Alternatively, the user or client application 132 may be hard coded into the memory of the user device 104.

As will be appreciated, the level of functionality that resides on the user device 104, as opposed to the first institution computing system 106 may vary depending on the implementation. The user application 132 may provide an interface that is configured to receive and display graphical user interfaces received from the first institution computing system 106 (e.g., graphical user interfaces prompting the user to provide information to create an account, graphical user interfaces displaying account balance information and past transactions, and so on).

The user application 132 may be used in connection with the first institution computing system 106 located at a brick-and-mortar store location. Additionally, the user application 132 may also be used in connection with online merchant transactions. In another embodiment, the user application 132 may be accessible via ecommerce transactions. For example, upon initiating a transaction at a digital storefront, the user application 132 may launch. The user application 132 may also be used in connection with a person-to-person (P2P) payment transaction. Via the user application 132, merchants may be provided with the ability to display marketing material, provide information, and promote products or discounts.

The user application 132 may present a user with multiple available accounts for transferring funds to the merchant for goods or services (or another recipient, such as in the context of a P2P transaction). For example, the user application 132 may include a mobile wallet application that enables a user to select a payment method, as is further discussed with respect to FIG. 5. An account holder may select a default account that is used to make payments. The account holder may use account selection logic to select the account the account holder wants to use to pay the merchant or other recipient.

The first institution computing system 106 and the second institution computing system 206 may each include a computer system (e.g., one or more servers each with one or more processing circuits 140, 240 each including at least one processor 142, 242 and at least one memory 144, 244). The processors 142, 242 may be implemented as application specific integrated circuits (ASICs), one or more field programmable gate arrays (FPGAs), a group of processing components, or other suitable electronic processing components. The memory 144, 244 may be one or more devices (e.g., RAM, ROM, Flash memory, hard disk storage, etc.) for storing data and/or computer code for completing and/or facilitating the various processes described herein. The memory 144, 244 may be or include non-transient volatile memory, non-volatile memory, non-transitory computer storage media. The memory 144, 244 may include data base components, object code components, script components, or any other type of information structure for supporting the various activities and information structures described herein. The memory may be communicably connected to the processor and include computer code or instructions for executing one or more processes described herein.

With the above in mind, the first institution computing system 106 includes a network interface circuit 124 and a processing circuit 140 including a processor 142 and a memory 144. The memory 144 includes an account database 146. In another embodiment, the account database 146 may be a separate information or data repository relative to the memory 144. In one embodiment, the first institution computing system 106 is operated by a first banking or provider entity that maintains and handles transaction processing for user accounts. Certain of the user accounts may be referred to as mobile wallet accounts to signify that these accounts are provisioned to the user application 132, which may be a mobile wallet that holds multiple accounts (e.g., credit card account, debit card account, rewards card account, etc.) which may be provided from the same or different institutions. In another embodiment, the user application 132 may be a provider institution (i.e., first institution) specific client application that houses only accounts maintained by the provider institution. In either embodiment, the flow of funds into and out of the accounts may be processed by the first institution computing system 106.

The first institution computing system 106 is configured to store information regarding accounts of users or customers of the first institution computing system 106 (e.g., mobile wallet accounts). As will be appreciated, the extent to which transaction details are tracked and maintained in processing circuit 140 and stored in the memory 144 may vary in differing embodiments. The account database 146 may store details regarding credit and/or debit card accounts, DDA accounts such as checking accounts and savings account, payment rail identification numbers, transaction identification numbers, etc. In particular, the memory 144 may store each financial transaction that occurred. Each financial transaction may include transaction data such as the amount of the transaction, a transaction ID, a recipient identifier (e.g., MCC of a merchant, etc.), a transaction location, a transaction time, etc.

According to various embodiments, the processing circuit 140 may be configured to generate a token to enable secure communication between the user device 104 and the first institution computing system 106. The token may include user data, including a location of the transaction (e.g., from GPS of the user device), an account number other identifier for one or more accounts (e.g., DDAs) that are utilized to complete a transfer of funds, as described further herein. The processing circuit 138 of the first institution computing system 106 may further be configured to provide an indication of a completed transfer of funds (e.g., a funds provided confirmation).

The terminal device 304 may be used by an individual user (e.g., a business owner or employee, a consumer, etc.) to interact with a terminal application 332 to implement at least some of the functions described herein. For example, the terminal device 304 may be used by an attendant or employee of a merchant. In self-checkout situations, the terminal device 304 may be used by the user (i.e., sender) described herein. The terminal device 304 may, for example be, a point of sale (POS) device in merchant transaction embodiments. In other embodiments, such as P2P transactions, the terminal device 304 may be a recipient computing device, such as a smart phone, a personal digital assistant, a portable gaming device, or other suitable device.

The terminal device 304 is shown to include a network interface circuit 324, a processing circuit 326 having a processor 328 and a memory 330, a terminal application 332, and an input/output device 336. The network interface circuit 324 may include, for example, program logic and any associated hardware (e.g., transceivers, wireless cards, etc.) that connects the terminal device 304 to the network 108. The input/output device 336 may be used to permit the user to initiate a transaction. The input/output device 336 may include, for example, a keypad or keyboard, a touchscreen, a microphone, a speaker, an input-only device, an output-only device, an input and/or output device, and/or other suitable devices and/or systems. In the example shown, the terminal device 304 is configured or structured as a POS terminal. The terminal device 304 may include or be coupled to a scanner that is capable of scanning optical codes, such as UPCs, QR codes, etc. The terminal device 304 may also include an NFC transceiver configured to receive NFC payloads from other NFC transceivers (e.g., payment tokens). In the P2P scenario, the terminal may have the same or similar structure as the user device 104 described herein.

The terminal application 332 may include program logic executable by the terminal device 304 to implement at least some of the functions described herein. For example, if the terminal device 304 is a point-of-sale device, the terminal device may be preloaded with program logic executable by the terminal device 304 to implement at least some of the functions described herein. In another example embodiment wherein the terminal device 304 is a mobile device, such as a cell phone, a tablet, etc., the second institution computing system 206 may provide a software application and make the software application required to access the terminal application 332 available to be provided to the terminal device 304. For example, the second institution computing system 206 may make the software application available to be downloaded (e.g., via the online banking website of the mobile wallet bank, via an app store, or in another manner). Responsive to a user selection of an appropriate link, the mobile wallet application may be transmitted to the terminal device 304 and may cause itself to be installed on the terminal device 304. Installation of the software application creates the terminal application 332 on the terminal device 304. Specifically, after installation, the thus-modified terminal device 304 includes the terminal application 332 (embodied as a processor and instructions stored in non-transitory memory that are executed by the processor).

As will be appreciated, the level of functionality that resides on the terminal device 304 as opposed to the second institution computing system 206 may vary depending on the implementation. The terminal application 332 may provide an interface that is configured to receive and display mobile web pages received from the second institution computing system 206 (e.g., web pages prompting the user to provide information to create an account, web pages displaying account balance information and past transactions, and so on). Upon initiation of a transaction, the terminal application 332 may request data from a token service provider (TSP) to generate a unique code/token. The unique code/token may then be transmitted by the terminal device 304 to the user device 104 and then to the first institution computing system 106 as part of a transaction. According to various embodiments, the token may include transaction data. Further, the terminal application 332 may be used in connection with physical (e.g., "brick and mortar") store location transactions.

The terminal application 332 is configured to receive, identify, and/or generate transaction data. The transaction data defines one or more attributes of a transaction, such as a payment amount, a merchant identifier (ID) that is unique to the merchant requesting payment, a list of the items being purchased and associated item identifiers, a merchant account ID that uniquely identifies the institution account associated with the merchant, a payment rail ID that uniquely identifies the payment rail to be used to complete the purchase, a transaction number that uniquely identifies the transaction, loyalty and/or rewards information, and/or promotions being offered by the merchant. The transaction data may be generated in response to receiving a transaction input. For example, the terminal application 332 may receive a transaction amount, a transaction ID, and/or a list of the items being purchased from a scanning device coupled to the terminal (or included as a part of the terminal device). In some embodiments, the terminal application 332 may receive a manual input for a transaction amount. Other transaction data may be generated in response to a merchant logging into the terminal application 332. For example, during registration for the terminal application 332, the merchant may be required to enter various identifying information (e.g., identity of the merchant, identification number for an account for funds to be transferred to, a payment rail identification number, etc.) which may be included in the transaction data.

The second institution computing system 206 includes a network interface circuit 226 and a processing circuit 240 including a processor 242 and a memory 244. The memory 244 includes an account database 246. In one embodiment, the second institution computing system 206 is operated by a second banking entity that maintains and handles transaction processing for the recipient, such as a merchant (e.g., via a payment rail). Thus, the second institution may be the acquiring institution or acquirer to signify it as the fund acquiring entity.

The account database 246 may store details regarding credit card accounts, checking accounts, savings account, DDA accounts, payment rail identification numbers, etc. In particular, the memory 244 may store each financial transaction that occurred. Each financial transaction may include transaction data such as the amount of the transaction and the merchant.

According to various embodiments, the processing circuit 240 may be configured to generate a token to enable secure communication between the user device 204 and the second institution computing system 206. The token may include user data, including an account number for one or more accounts (e.g., DDAs) that are utilized to complete a transfer of funds, as described further herein. The processing circuit 238 of the second institution computing system 206 may further be configured to provide an indication of a completed transfer of funds (e.g., a funds provided confirmation).

As shown, the payment processing system 100 includes a payment rail computing system 406. The payment rail computing system 406 is configured to process a transfer of funds from the first institution computing system 106 (e.g., from a first DDA account associated with purchaser) to the second institution computing system 206 (e.g., to a second DDA account associated with a merchant). According to various embodiments, the payment rail 406 receives or otherwise transfers funds (e.g., as a part of the process 540) from the first institution computing system 106 to the second institution computing system in real time or near real time. For example, the user device 104 (e.g., operated by a purchaser or sender) may receive transaction data (e.g., via a merchant token) from the terminal device 304 (e.g., associated with a merchant or recipient) that identifies a specific payment rail and an account associated with the merchant (e.g., with the second institution computing system 206). The user device 104 may provide the transaction data to the first institution computing system 106 such that the first institution computing system 106 can initiate a transfer of funds via the payment rail 406 (e.g., the payment rail identified in the transaction data) and indicate the appropriate account the payment rail 406 should provide the funds to (e.g., the account with the second institution computing system). The payment rail computing system 406 may include The Clearing House Real Time Payment (RTP®), the FedNow, or any other payment rail platform.

Figure 2:
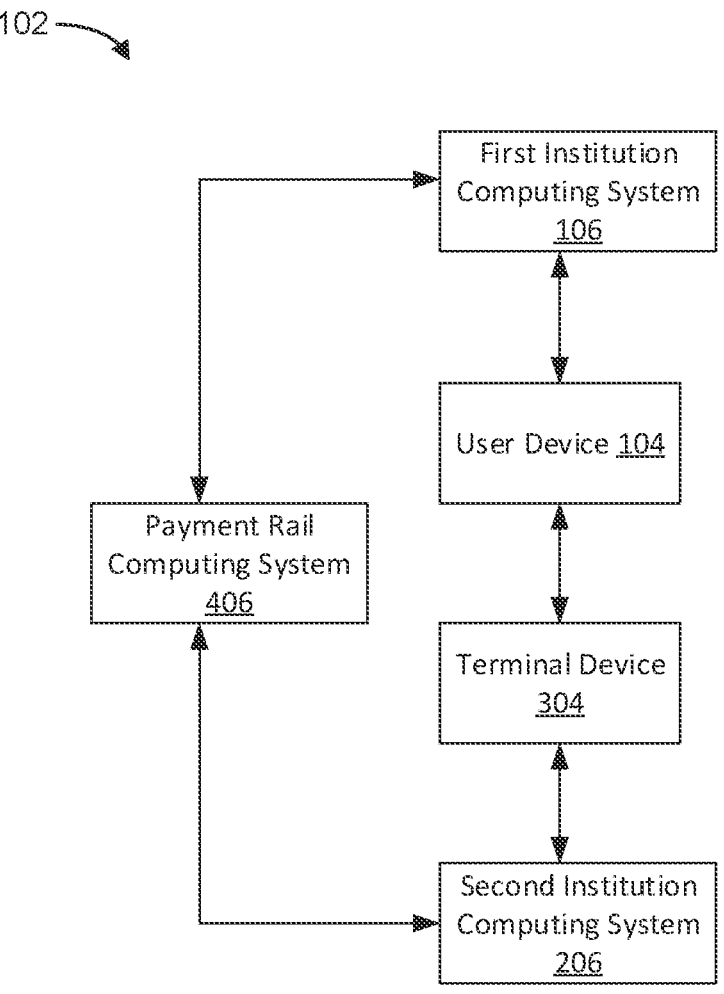
FIG. 2 illustrates an example arrangement of the transaction processing system of FIG. 1, according to an example embodiment.

Referring now to FIG. 2, a sample arrangement of the payment processing system 102 of FIG. 1 is shown, according to an example embodiment. As shown, the user device 104 is communicably coupled to the terminal device 304. In the example shown and primarily described herein, the user device 104 and the terminal device 304 may communicate using a NFC, wireless, Bluetooth, low energy Bluetooth, RFID, or another short-range wireless communication protocol (e.g., to transmit an optically scannable code, such as QR code) as is discussed further herein. The user device 104 is communicably coupled the first institution computing system 106 via the network 108. For example, the user device 104 may communicate with the first institution computing system 106 using Wi-Fi, cellular 3G, 4G, GSM, LiFi, hypersonic or other method as is discussed further herein. The terminal device 304 is communicably coupled the second institution computing system 206 via the network 108. For example, the terminal device 304 may communicate with the second institution computing system 206 using Wi-Fi, cellular 3G, 4G, GSM, LiFi, hypersonic or other method as is discussed further herein. As shown, the payment rail computing system 406 is configured to individually communicate with the first institution computing system 106 and the second institution computing system 206 via the network 108 such that payment rail 406 can transfer funds between the first institution computing system 106 and the second institution computing system 206.

Figure 4:
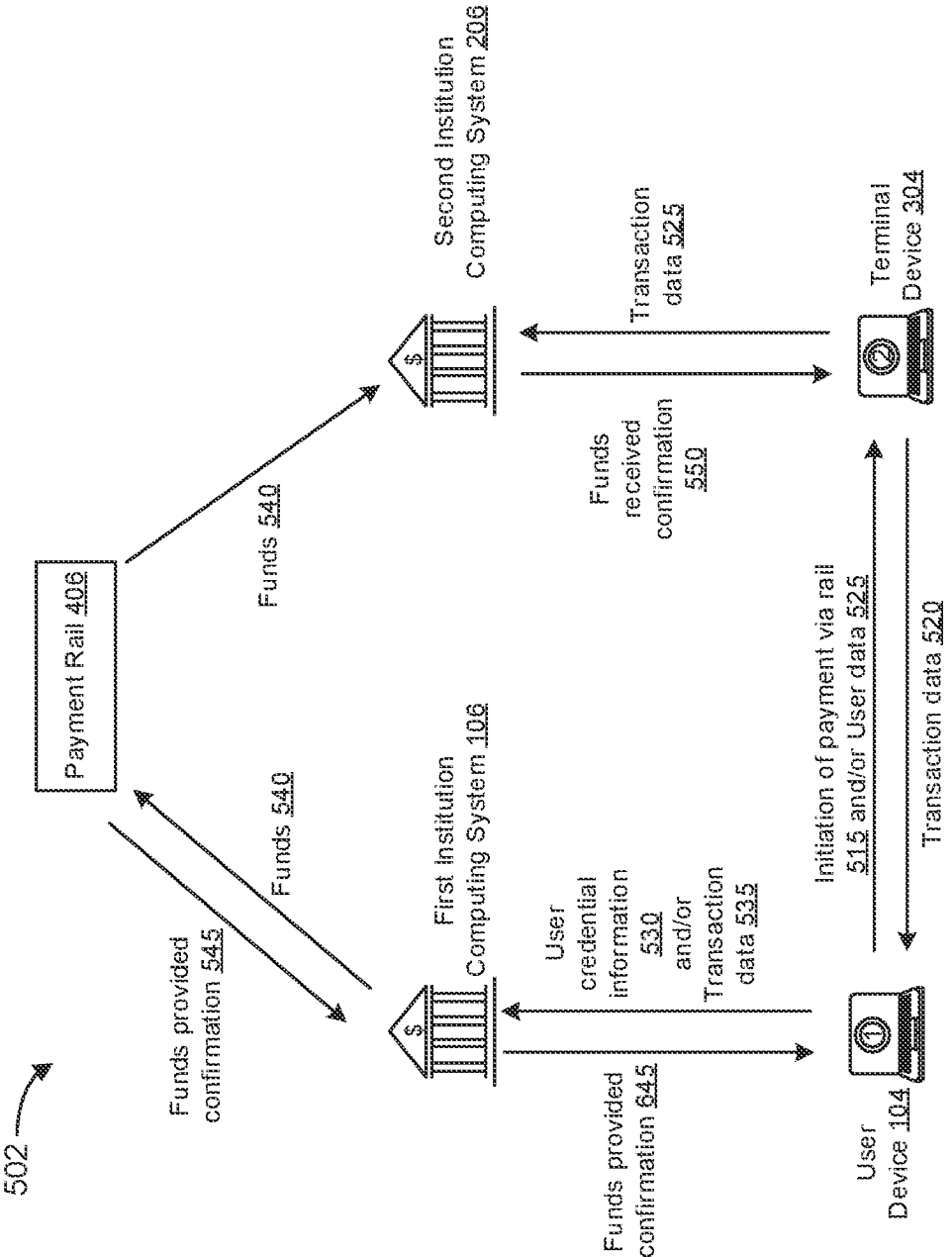
FIG. 4 illustrates an example arrangement of the method of transferring resources of FIG. 3, according to an example embodiment.

Referring now to FIGS. 3 and 4, a method 500 of transferring a resource, such as funds, and an example arrangement of the method of transferring funds 502 are shown, respectively. The method of transferring funds 500 may be utilized to transfer funds from a first account to a second account in real time or near real time such that the funds may be accessed by an owner of the second account instantly or nearly instantly. Unlike mobile wallets that are used to initiate credit card transactions, the method 500 leverages a payment rail (e.g., The Clearing House Real Time Payment (RTP®), the FedNow, etc.) to facilitate the transfer of funds from a first account (e.g., a first demand deposit account (DDA) with a first institution) to a second account (e.g., a second demand deposit account (DDA) with a second institution) in real time or near real time. By doing so, the payment system enables the receiver of the funds to instantaneously access the funds without the waiting for settlement. By using the payment rail, the associated transaction fees may be lower than a credit card-based transaction because the merchant may be charged lower fees by the payment rail system than a credit card company. It should be appreciated that the processes shown in FIGS. 3 and 4 need not be performed in the order shown. Further, the various processes may be omitted, and addition processes may be included.

At process 510, a payment amount is determined. For example, the terminal device 304 may determine the payment amount. The terminal device 304 determines a payment amount based in response to receiving a transaction request. For example, the terminal device 304 may be communicably coupled to a register machine (e.g., a scanning device) configured to output a payment amount in exchange the purchase of one or more items. According to various embodiments, the register machine may communicate additional transaction data to the terminal device 304, such as a merchant ID, a list of items being purchased, a transaction ID, etc. According to various embodiments, the register machine and the terminal device 304 may be a single integral device.

In another example embodiment, the payment amount may be determined based on a user input into the terminal device 304. For example, the terminal device 304 may be a mobile device that a user (e.g., a merchant) may use to manually input a payment amount and/or other transaction data.

At process 515, a transaction is initiated between the user device 104 and the terminal device 304. For example, the user device 104 and the terminal device 304 may establish communication via short range communication (e.g., NFC, Bluetooth, low energy Bluetooth, RFID, etc.). The terminal device 304, in response to receiving transaction data, may output a short-range communication signal and the user device 104 may receive the short range communication signal when located in proximity of the terminal device 304.

Additionally or alternatively, process 515 may include scanning a code (e.g., a QR code, barcode, etc.). For example, the user device 104 may scan a code displayed on the terminal device 304 to establish communication between the user device 104 and the terminal device 304. Alternatively, the terminal device 304 may scan a code displayed on the user device 104 to establish communication between the user device 104 and the terminal device 304.

At process 520, transaction data is provided to the user device 104. In contrast to typical transactions where the user device provides information to the terminal device (e.g., POS), in this situation, the transaction data is provided via the short-range communication channel to the user device 104 (i.e., a reverse flow to typical transactions). The transaction data defines one or more attributes of a transaction, such as a payment amount, a merchant identifier (ID) that is unique to the merchant requesting payment, a list of the items being purchased as well as individual item identifiers, a merchant account ID that uniquely identifies the merchant (e.g., a MCC), information regarding a transaction location (e.g., geolocation information), a transaction ID, destination information that uniquely identifies the institution account associated with the merchant, a payment rail ID that uniquely identifies the payment rail to be used to complete the purchase, a transaction number that uniquely identifies the transaction, and/or promotions being offered by the merchant. The transaction data may be generated in response to receiving the transaction data at process 510. For example, the terminal application 332 may receive a transaction amount, a transaction ID, and/or a list of the items being purchased from a terminal as discussed above. Additionally, the terminal application 332 may receive a manual input for a transaction amount.

Other transaction data may be generated in response to a merchant logging into the terminal application 332. For example, during registration for the terminal application 332, the merchant may be required to enter various identifying information (e.g., identity of the merchant, identification number for an account for funds to be transferred to, a payment rail identification number, etc.) which may be included in the transaction data.

According to an example embodiment, the terminal device 304 may provide the transaction data to the user device 104 via NFC. Further, if the terminal device 304 generates a code for the user device 104 to scan, transaction data may be embedded in the code.

According to an example embodiment, some or all of the transaction data may be tokenized before being provided to the user device 104. For example, a merchant token may be generated and provided to the user device 104. The merchant token may include information that is specific to the merchant, such as the destination information (e.g., a bank ID, a routing number, an account number, etc.) that identifies the desired destination for the funds to be transferred to, which may be tokenized before being provided to the user device 104 (hence, merchant token). In this way, the merchant token be a numeric, alpha, and/or alphanumeric value specific to the merchant. The merchant token may be valid for a predefined number of uses and/or time. The first institution computing system 106 and/or the payment rail 406 may later utilize the tokenized destination information to determine the account that the funds are to be transferred to.

At process 525, user data is provided to the terminal device 304. For example, the user device 104 may provide user data to the terminal device 304 via the network 108. The user data defines one or more attributes or the user device and/or the purchaser. For example, the user data may include a device ID that is unique to the user device, a purchaser ID that uniquely identifies the purchaser, a customer reward number associated with the purchaser, an indication that the purchaser intends to pay via a real time or nearly real time payment rail, and/or an account number that identifies the institution account operated by the purchase.

According to an example embodiment, some or all of the user data may be tokenized before being provided to the terminal device 304. For example, the purchaser account information (e.g., a bank ID, a routing number, an account number, etc.) that identifies the purchasers designated account to be used for the transaction may be tokenized and the token may be provided to the terminal device 304. The terminal device 304 and/or the second institution computing system 206 and/or the payment rail 406 may later utilize the tokenized purchaser account information to confirm receipt of the funds from the purchaser.

According to various embodiments, the terminal device 304 may add some or all of the user data to the transaction data and provide the updated transaction data to the second institution computing system 206. The second institution computing system 206 may create a ticket in response to receiving the transaction data. When the second institution computing system 206 receives the funds corresponding with the payment amount (e.g., as defined in the transaction data) from an account associated with the user of the user device 104 (e.g., as defined in the transaction data), the ticket may be closed by the second institution computing system 206. If a ticket remains open for longer than a predetermined amount of time, an alert may be provided from the second institution computing system 206 to the terminal device 304 such that the terminal device 304 displays an error message.

At process 530, user credential information (e.g., biometric information, PIN, passcode, etc.) is provided to the first institution computing system 106. For example, the user device 104 may provide (e.g., via the user application 132) the user credential information to the first institution computing system 106. The user credential information may need to be verified by the first institution computing system 106 before the first institution computing system 106 provides funds to the payment rail 406, as is discussed further below. In other embodiments, the user client application 132 may receive and verify received credential information without transmitting such information to the first institution computing system 106. This may promote even faster transaction processing.

According to various embodiments, the user application 132 may prompt a user to input a username, a passcode, and/or biometric scan before the user credential information is provided to the first institution computing system. For example, the user device 104 may display an indication of the payment amount, the list of items purchased, and/or the merchant ID based on the received transaction data.

According to an example embodiment, some or all of the user credential information data may be tokenized before being provided to the first institution computing system 106. For example, the username, passcode, and/or biometric scan that identifies the purchaser may be tokenized and the token may be provided to the first institution computing system 106 for secure transfer of information. According to various embodiments, the token may be stored on the user device 104 such that the user application 132 can provide the token to the first institution computing system 106.

By storing the tokenized credential information, the user application's 132 credential manager can be leveraged to initiate instant or near instant payment to a merchant based on the transaction information received from the terminal device 304. Unconventionally, since the provisioning of payment is initiated by the purchaser's institution computing system 106 rather than the terminal device 304 issuing a charge to the purchaser's institution computing system 106, the transaction funds may be transferred instantaneously or near instantaneously such that the merchant can access the funds instantaneously or near instantaneously. Thus, by using a user application 132 with a credential manager that is capable of connecting to various institution computing systems and connecting and storing tokenized accounts (e.g., DDA accounts), the user device 104 can initiate credit push transfers (e.g., real time payments) when prompted with contactless technology that can trigger the transfer (e.g., via NFC or QR codes). This arrangement may enable process flows that support integration and ubiquity amongst existing user devices, terminal devices and multiple institutions without a domestic payments scheme offered by a national bank.

At process 535, transaction data is provided to the first institution computing system 106. As discussed above, the transaction data defines one or more attributes of a transaction, such as a payment amount, a merchant identifier (ID) that is unique to the merchant requesting payment, a list of the items being purchased, a merchant account ID that uniquely identifies the merchant, destination information that uniquely identifies the institution account associated with the merchant, a payment rail ID that uniquely identifies the payment rail to be used to complete the purchase, a transaction number that uniquely identifies the transaction, and/or promotions being offered by the merchant.

Further, the user device 104 may add additional data to the transaction data. For example, some or all of the user data may be added to the transaction data before being transmitted to the first institution computing system. For example, as is discussed further with respect to FIG. 5, a user may indicate a desired account to withdraw funds from to complete the transaction. This indication may be added to the transaction data by the user device 104 and provided to the first institution computing system 106 such that the first institution computing system 106 withdraws funds from the desired account to complete the transaction.

At process 540, funds are transferred from the first institution computing system 106 to the second institution computing system 206 via the payment rail 406. For example, the first institution computing system 106 may provide funds to the payment rail 406 indicated in the transaction data. The fund transfer further includes instructions to transfer the funds to the account identified by the transaction data (e.g., the merchant's account with the second institution computing system 206. The payment rail 406 then provides the finds to the account identified by the transaction data.

At process 545, a confirmation of funds provided is provided to the first institution computing system 106. For example, the confirmation of funds provided may be provided in response to receiving the funds from the first institution computing system 106 and/or in response to successfully provision the funds to the second institution computing system 206.

According to various embodiments, the confirmation of funds provided includes a receipt, which may be provided to the user device 104 from the first institution computing system 106. The receipt may include an indication of some or all of the transaction information. For example, the receipt may include the payment amount, the list of items, the merchant, a time of the payment, a geolocation of the terminal device 304, etc. According to various embodiments, the confirmation of funds is an electronic message that is accessible via the user application 132. Additionally or alternatively, the confirmation of funds may be displayed on the terminal device 304. The terminal device 304 and/or the user device 104 may further prompt the user for an input regarding the confirmation of funds. For example, a prompt may be presented that asks if the user would like a physical copy of the confirmation of funds provided. The user may then use the user device 104 and/or the terminal device to request a physical copy and the terminal device 304 may print a physical copy in response.

At process 550, confirmation of funds received is provided to the terminal device 304. For example, the second institution computing system 206 may send the confirmation of funds to the terminal device 304 in response to the funds being received by the account defined in the transaction data sent from the terminal device 304 to the second institution computing system.

According to various embodiments, the confirmation of funds provided includes a receipt, which may be provided to the terminal device 304 from the second institution computing system 206. The receipt may include an indication of some or all of the transaction information. For example, the receipt may include the payment amount, the list of items, the purchaser, a time of the payment, a geolocation of the user device 104, etc.

Figure 5:
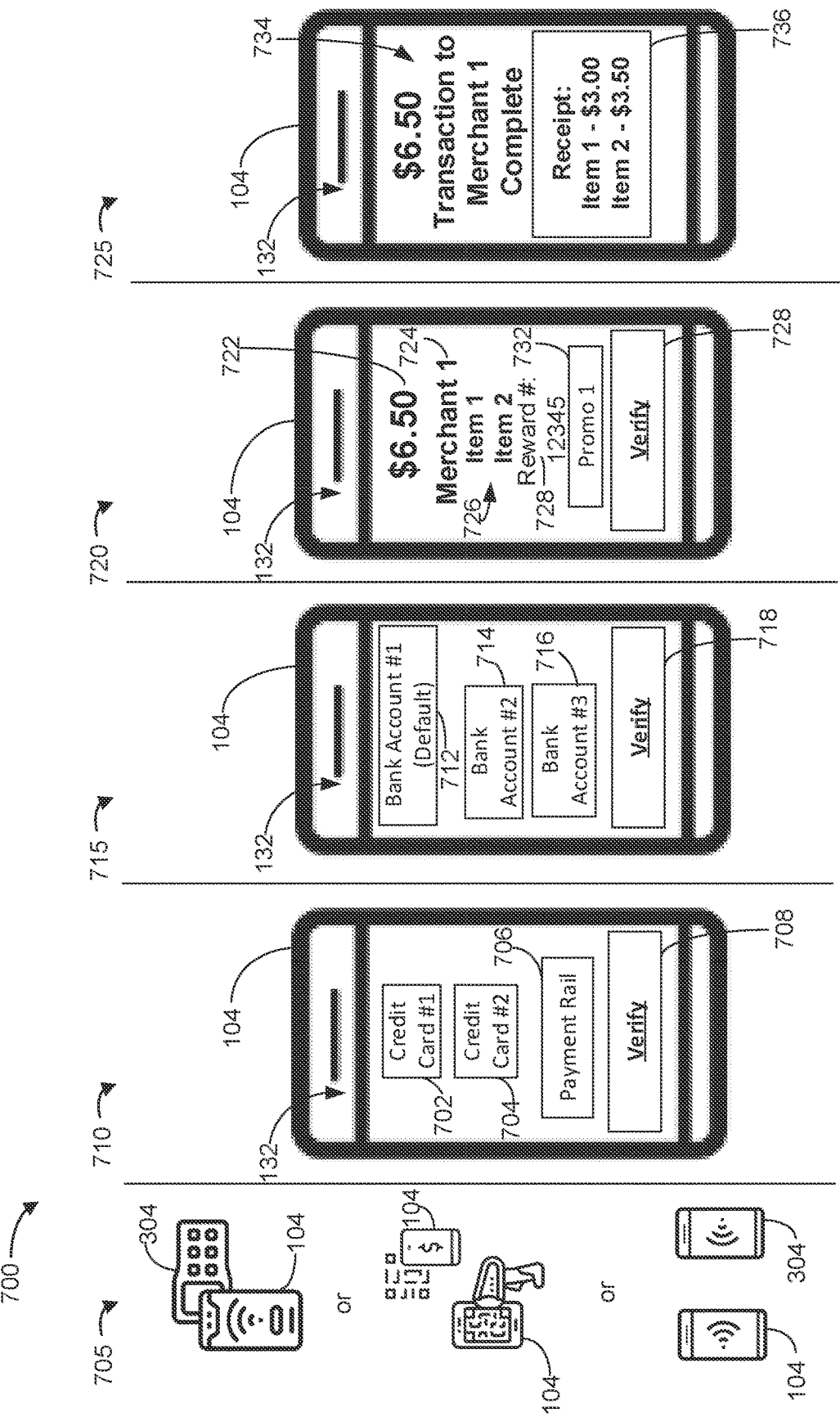
FIG. 5 illustrates a method for transferring resources, according to another example embodiment.

Referring now to FIG. 5, an example a method for transferring resources, such as funds, 700 is shown, according to an example embodiment. The method of transferring funds 700 utilizes the user device 104 and the terminal device 304 to transfer funds from a first account to a second account. For example, a user of the user device 104 may utilize the user application 132 to complete a transaction with the terminal device 304. It should be appreciated that the processes shown in FIG. 5 need not be performed in the order shown. Further, the various processes may be omitted, and addition processes may be included.

At process 705, a transaction between a user device 104 and a terminal device 304 is imitated. As shown, the initiation is via a short-range communication (e.g., NFC, Bluetooth, etc.) between the user device 104 and the terminal device 304. In the example shown, the short-range wireless communication is NFC where the user device 104 "taps" the terminal device 304. In other embodiments, the initiation may be based on the user device 104 scanning a code associated with the terminal device 304 or the terminal device 304 scanning a code on the user device 104 using a scanner associated with the terminal device 304. In still other alternative embodiments, the user device 104 and the terminal device 304 may initiate the transaction using the network 108. For example, the user device 104 and the terminal device 304 may both be mobile devices configured to use any number of forms of communication (e.g., Wi-Fi, etc.)

At process 710, a user indicates a form of payment to be used in the transaction. For example, the user application 132 may display one or more mobile cards (e.g., credit card #1 702, credit card #2 704, etc.). The user application 132 may also include an option to pay via payment rail 706. The user may select the payment rail option 706, which then places the user device in a receiving mode that enables the device to receive transaction data from the terminal device 304. In response to selecting the option to pay via payment rail, the user application 132 may recall a transaction ID generator for this process once initiated. The user application 132 may require user verification 708 before communicating the intent to pay via payment rail. For example, the user application 132 may be request a username and password information (or, other credential information) from the user, to prompt the user to provide information regarding the amount of a payment and which merchant or individual (e.g., name, address, phone number or e-mail, a selection of a recipient stored in the memory 130 of the user device 104, etc.) is to receive a payment. Additionally, or alternatively, the screen may be used to request a biometric scan from the user to initiate a payment.

At process 715, a user selects a desired account to use to complete the transaction. For example, after initiating the transaction, the terminal device 304 may provide a transaction request including transaction data to the user device 104, including a payment amount. The user application 132 may determine the accounts that have sufficient funds to complete the transaction request and present these account for display (e.g., bank account #1 712, which is the default bank account, bank account #2 714, and bank account #3 716). It should be appreciated that each of the accounts displayed may be associated with different institutions. For example, the user application 132 may be configured to operate as a credential manager to connect to multiple bank accounts to enable contactless (e.g., NFC or QR codes) to initiate instant payments at the terminal device 304. The user may then select a desired account to complete the transaction. The user application 132 may require user verification 718 before communicating the intent to pay via payment rail. For example, the user application 132 may be request a credential (e.g., username and password information, PIN, biometric information, a combination thereof, etc.) from the user, to prompt the user to provide information regarding the amount of a payment and which merchant or individual (e.g., name, address, phone number or e-mail, a selection of a recipient stored in the memory 130 of the user device 104, etc.) is to receive a payment.

At process 720, transaction data is presented on the user application 132 for review before sending instructions to the first institution computing system 106 to provide funds to the second institution computing system 206. For example, the user application 132 may display an indication of the payment amount 722, the merchant ID 724, a list of items included in the purchase, information identifying the user, such as a customer reward number 728, promotional material 732 such as coupons, rebates, rewards available, etc. The user application 132 may require user verification 718 before sending instructions to the first institution computing system 106 to provision payment. For example, the user application 132 may be request a username and password information from the user, to prompt the user to provide information regarding the amount of a payment and which merchant or individual (e.g., name, address, phone number or e-mail, a selection of a recipient stored in the memory 130 of the user device 104, etc.) is to receive a payment. Additionally, or alternatively, the screen may be used to request a biometric scan from the user to provision a payment.

At process 725, confirmation of a successful transaction 734 is displayed on the user application 132. The confirmation of a successful transaction 734 includes a receipt 736, which may be stored on the user application 132 for future reference.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "logic" may include hardware and machine-readable media storing instructions thereon for configuring the hardware to execute the functions described herein. The logic may be embodied as one or more circuitry components including, but not limited to, processing circuitry, network interfaces, peripheral devices, input devices, output devices, sensors, etc. In some embodiments, logic may take the form of one or more analog circuits, electronic circuits (e.g., integrated circuits (IC), discrete circuits, system on a chip (SOCs) circuit, etc.), telecommunication circuits, hybrid circuits, and any other type of circuit. In this regard, the "logic" may include any type of component for accomplishing or facilitating achievement of the operations described herein. For example, logic as described herein may include one or more transistors, logic gates (e.g., NAND, AND, NOR, OR, XOR, NOT, XNOR, etc.), resistors, multiplexers, registers, capacitors, inductors, diodes, wiring, and so on).

Thus and based on the forgoing, the "logic" may be embodied as one or more processing circuits comprising one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the operations described herein. In some embodiments, the one or more processors may be shared by multiple "logics" (e.g., logic A and logic B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more suitable processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given "logic" or components thereof may be disposed lo. ly (e.g., as part of a local server, a local computing system, etc.) or remotely (e.g., as part of a remote server such as a cloud-based server). To that end, "logic" as described herein may include components that are distributed across one or more locations.

An example system for providing the overall system or portions of the embodiments might include one or more computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency, funds, or resources are intended to include fiat currencies, non-fiat currencies (e.g., precious metals), and math-based currencies (often referred to as cryptocurrencies). Examples of math-based currencies include Bitcoin, Litecoin, Dogecoin, and the like. In the examples described herein, the funds or resources refer to U.S. dollars, but of course, other variations are possible (e.g., Euros, etc.).

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
determining, by a terminal device, a payment amount in response to receiving a transaction request;
providing, by the terminal device, transaction data to a user device in response to initiating a transaction with the user device, the transaction data including the payment amount, a payment rail identification identifying a payment rail for completing the transaction, and destination information;
receiving, by the terminal device, user data from the user device, the user data including a request to provide funds via the payment rail identified by the payment rail identification and account information identifying a first institution associated with the user device; and
receiving, by the terminal device, a funds received confirmation from a second institution computing system, wherein the funds received confirmation is provided to the terminal device in response to a funds transfer corresponding with the payment amount being received by the second institution computing system from the payment rail,
wherein the payment rail receives the funds transfer from a first institution computing system associated with the first institution in response to the transaction data being provided to the first institution computing system from the user device.

2. The computer-implemented method of claim 1, wherein the destination information provided to the user device from the terminal device further includes an account identifier, and
wherein the payment rail identified by the payment rail identification provides the funds transfer to the second institution computing system based on the account identifier.

3. The computer-implemented method of claim 1, wherein the transaction data provided to the user device from the terminal device includes a merchant identifier configured to identify an operator of the terminal device such that the user device can determine an identity of the operator of the terminal device.

4. The computer-implemented method of claim 1, wherein at least a portion of the transaction data provided to the user device from the terminal device is provided via a merchant token.

5. The computer-implemented method of claim 1, wherein initiating the transaction with the user device includes capturing a code using a scanning device of the user device.

6. The computer-implemented method of claim 5, wherein the code includes a QR code, the method further comprising:

displaying, by the terminal device, the code on a display screen of the terminal device.

7. The computer-implemented method of claim 1, wherein the user device is a first mobile device and the terminal device is a second mobile device.

8. The computer-implemented method of claim 1, wherein the terminal device is a point-of-sale device.

9. A user device comprising:

at least one processor; and at least one memory coupled to the at least one processor, the at least one memory having instructions stored thereon that when executed by the at least one processor, cause the at least one processor to:

provide an initiation of a payment via a payment rail to a terminal device;

receive transaction data from the terminal device, the transaction data including a payment amount, a payment rail identification identifying the payment rail for completing the payment, and destination information;

provide user credential information to a first institution computing system, the user credential information including at least one of biometric information, a PIN, or a passcode;

provide at least a portion of the transaction data to the first institution computing system, the portion of the transaction data including the payment amount, the payment rail identified by the payment rail identification, and the destination information such that the first institution computing system provisions funds corresponding to the payment amount to the payment rail with instructions to provision the funds from the payment rail to an account identified in the destination information in response to receiving the portion of the transaction data; and receive a funds provided confirmation from the first institution computing system in response to the first institution computing system provisioning funds to the payment rail identified by the payment rail identification.

10. The user device of claim 9, wherein the initiation of payment via the payment rail identified by the payment rail identification is provided to the terminal device in response to a user selection of an intention to pay via the payment rail within a user application of the user device.

11. The user device of claim 9, wherein the initiation of payment via the payment rail identified by the payment rail identification is provided to the terminal device via a NFC data exchange.

12. The user device of claim 9, wherein the initiation of payment via the payment rail identified by the payment rail identification is provided to the terminal device in response to the user device scanning a code displayed on the terminal device.

13. The user device of claim 9, wherein the user credential information is provided to the first institution computing system via a token.

14. The user device of claim 13, wherein the token is stored on the user device.

15. A terminal device, comprising:

at least one processor; and at least one memory coupled to the at least one processor, the at least one memory having instructions stored thereon that when executed by the at least one processor, cause the at least one processor to:

provide transaction data to a user device in response to initiating a transaction with the user device, the transaction data including a payment amount, a payment rail identification identifying a payment rail for completing the transaction, and destination information;

receive user data from the user device, the user data including a request to provide funds via the payment rail identified by the payment rail identification and account information identifying a first institution associated with the user device; and receive a funds received confirmation from a second institution computing system, wherein the funds received confirmation is provided to the terminal device in response to a fund transfer corresponding with the payment amount being received by the second institution computing system from the payment rail, and wherein the payment rail receives the fund transfer from a first institution computing system associated with the first institution in response to the transaction data being provided to the first institution computing system from the user device.

16. The terminal device of claim 15, wherein the destination information provided to the user device from the terminal device further includes an account identifier, and wherein the payment rail identified by the payment rail identification provides the fund transfer to the second institution computing system based on the account identifier.

17. The terminal device of claim 15, wherein the transaction data provided to the user device from the terminal device includes a merchant identifier configured to identify an operator of the terminal device such that the user device can determine an identity of the operator of the terminal device.

18. The terminal device of claim 15, wherein at least a portion of the transaction data provided to the user device from the terminal device is provided via a merchant token.

19. The terminal device of claim 15, wherein initiating the transaction with the user device is via a NFC data exchange between the terminal device and the user device.

20. The terminal device of claim 15, wherein the user device is a first mobile device and the terminal device is a second mobile device.

* * * * *